(12) United States Patent
Botz et al.

(10) Patent No.: US 6,747,676 B2
(45) Date of Patent: Jun. 8, 2004

(54) USER INTERFACE FOR DISPLAYING PROTECTED INFORMATION

(75) Inventors: Patrick S. Botz, Rochester, MN (US); Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 09/735,749

(22) Filed: Dec. 13, 2000

(65) Prior Publication Data

US 2002/0070964 A1 Jun. 13, 2002

(51) Int. Cl.[7] .................................................. G09G 5/00
(52) U.S. Cl. ........................ 345/741; 345/780; 345/859
(58) Field of Search ................................. 345/741, 742, 345/743, 689, 780, 859, 861; 713/202, 184

(56) References Cited

U.S. PATENT DOCUMENTS

| | | | | |
|---|---|---|---|---|
| 5,550,968 A | * | 8/1996 | Miller et al. | 345/741 |
| 5,805,911 A | * | 9/1998 | Miller | 715/534 |
| 6,067,625 A | * | 5/2000 | Ryu | 713/202 |
| 6,132,363 A | * | 10/2000 | Freed et al. | 600/16 |
| 6,208,339 B1 | * | 3/2001 | Atlas et al. | 345/780 |
| 6,377,965 B1 | * | 4/2002 | Hachamovitch et al. | 715/534 |
| 6,571,336 B1 | * | 5/2003 | Smith, Jr. | 713/184 |

OTHER PUBLICATIONS

"PhotoASA." May 20, 2000. [retreived on May 12, 2003]. Retreived from the Internet <URL: http://web.archive.org/web/20000520010708/http://www.photoasa.com/>.*

* cited by examiner

*Primary Examiner*—John Cabeca
*Assistant Examiner*—Blaine Basom
(74) *Attorney, Agent, or Firm*—Moser, Patterson & Sheridan, LLP

(57) ABSTRACT

Method for providing at least a portion of a disguised password in an undisguised form is described. More particularly, a program is described having a capability of displaying a single character at a time, more than one character at a time or all of otherwise disguised characters of a password in an undisguised form in response to a successful pre-password check.

7 Claims, 4 Drawing Sheets

USER INTERFACE FOR DISPLAYING PROTECTED INFORMATION

BACKGROUND OF THE INVENTION

1. Field of the Invention

The invention relates to a computer user interface and, more particularly, the invention relates to a computer user interface for displaying protected information.

2. Background of the Related Art

As more and more information is stored using electronic devices, the need for security has correspondingly increased. A security measure commonly used with computers is requiring a password prior to access. Conventionally, a computer user inputs a password into a password field on a computer display. However, rather than displaying actual text of an inputted password, conventionally a substitute symbol is used for each character. Examples of substitute symbols include, but are not limited to, X's and asterisks. Accordingly, substitute or masking symbols are displayed to disguise an inputted password to curtail unauthorized disclosure to persons within visual range of the computer display.

However, because of increased concerns for security, passwords are becoming more complex. For example, a password of at least eight characters is conventionally required to reduce susceptibility to attack Moreover, alpha-characters and numeric-characters may be interchangeably mixed to reduce the likelihood of deducing a password.

Thus, a user may type a long complicated password displayed only as some masking symbol and be denied access owing to something as trivial as a typographical error. Moreover, in some systems, after a number of failed attempts to gain access, a system administrator must be contacted to reset the password. In either case, time and effort are wasted due to a typographical error. Moreover, such errors may cause a degree of frustration, which may lead to avoiding proper security measures, such as not logging off a computer system, using a short or otherwise inadequate password, or storing a password on a computer system.

Therefore, a need exists in the art for an ability to identify one or more clerical inadvertences in an inputted password without significantly compromising security.

SUMMARY OF THE INVENTION

The invention provides a method for selectively displaying a portion of a password undisguised. In one aspect, a graphical user interface configured with a password field is displayed on a display device. The password is entered into the password field. A password access mode is invoked to provide access to at least a portion of the password.

Another aspect of the invention provides a method for selectively displaying a portion of a first password on a display device in communication with a programmed computer. The programmed computer is in communication with a cursor positioning device and a keyboard. A cursor object is invoked for display on the display device, and a graphical user interface is invoked for display on the display device. The graphical user interface is configured with a password field to receive the first password. A password access mode is invoked at least in partial response to the cursor object having a positional association with a portion of the graphical user interface. The password access mode is configured to provide access to at least a portion of the password in response to a second password.

The above as well as additional aspects of the present invention will become apparent in the following detailed written description.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
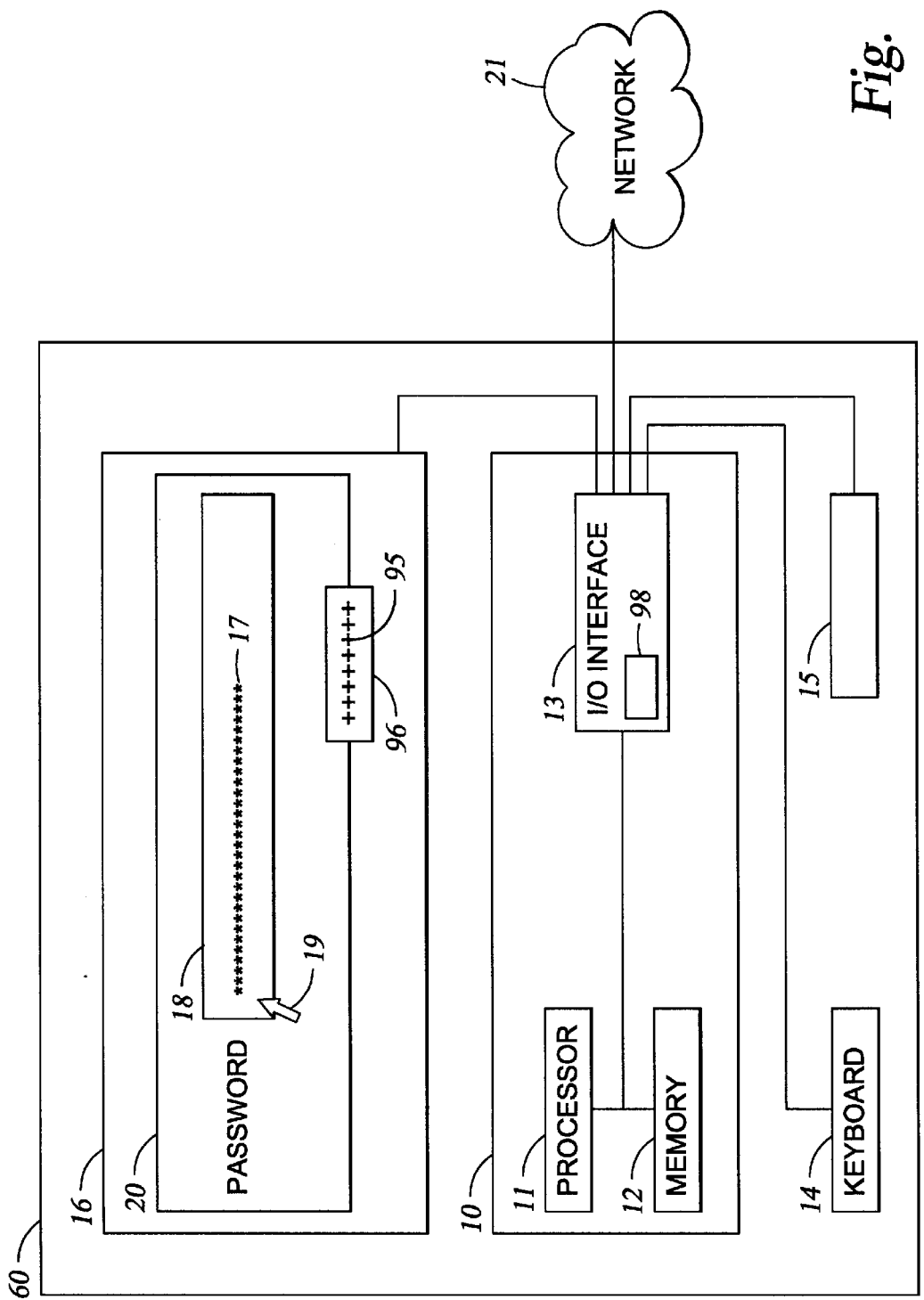
FIG. 1 is a block diagram depicting an exemplary portion of an embodiment of a computer system in accordance with an aspect of the present invention.

Referring to FIG. 1, there is shown a block diagram of computer system 60 coupled to a network 21. Network 21 may be a local area network (LAN), a wide area network (WAN), the Internet, or any combination thereof. Computer system 60 comprises display device 16, general-purpose computer 10, keyboard 14 and cursor pointing device 15. Computer 10 may be any general-purpose computer programmed with an operating system, such as OS/2, OS/400, Palm, Mac System 8, Linux, Unix, Solaris, Java Virtual Machine, Windows2000, Windows NT, Windows95, Windows98, or any earlier or later compatible version thereof. Moreover, computer 10 may be a desktop, notebook, or personal data assistant. Computer 10 comprises processor 11, memory 12 and input/output (I/O) interface 13, which are operatively coupled to one another. Coupled to I/O interface 13 is keyboard 14 and cursor pointing device 15, the latter of which may be a tablet, mouse, microphone, track ball, joy stick or the like. I/O interface 13 may also comprise a video display circuit having a buffer 98 for buffering information to be displayed on display device 16.

Display device 16 may comprise a plasma screen, cathode ray tube, liquid crystal display, micro-mirror display, light beam display, and the like used in a monitor. In general, display device 16 is used for displaying graphical password user interface object 20 having a password field 18 configured for displaying password characters or disguised characters of password 17. Display device 16 is also used for displaying a cursor object 19 that is associated with actuation of cursor pointing device 15.

Some embodiments of the invention are program products containing machine-readable programs. The program(s) of the program product defines functions of the embodiments and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Memory 12 may comprise volatile and/or non-volatile memory, including but not limited to magnetically readable memory (e.g., floppy disk, hard disk, and the like), optically readable memory (e.g., CD, DVD, and the like), and electrically readable memory (e.g., DRAM, SRAM, EEPROM, registers, latches, and the like). Though memory 12 is illustratively shown as a single block, it should be understood that memory 12 may comprise a plurality of elements existing at one or more levels of access with respect to processor 11.

Some embodiments of the present invention are program products that may reside in whole or in part in memory 12. By way of example and not limitation, memory 12 may be comprise DRAM sufficient to hold at least a portion of password access program 30 (illustratively shown in FIG. 2) and data structures 53 in accordance with an embodiment of the present invention. Data structure 53 may comprise information (some of which may be user configurable) accessible by program 30 (illustratively shown in FIG. 2). By way of example and not limitation, such information associated with program 30 comprises cursor position set points representative of a relative position threshold between a cursor object and a password field, selected mode (described in more detail below), and other information used by or generated by program 30.

Figure 2:
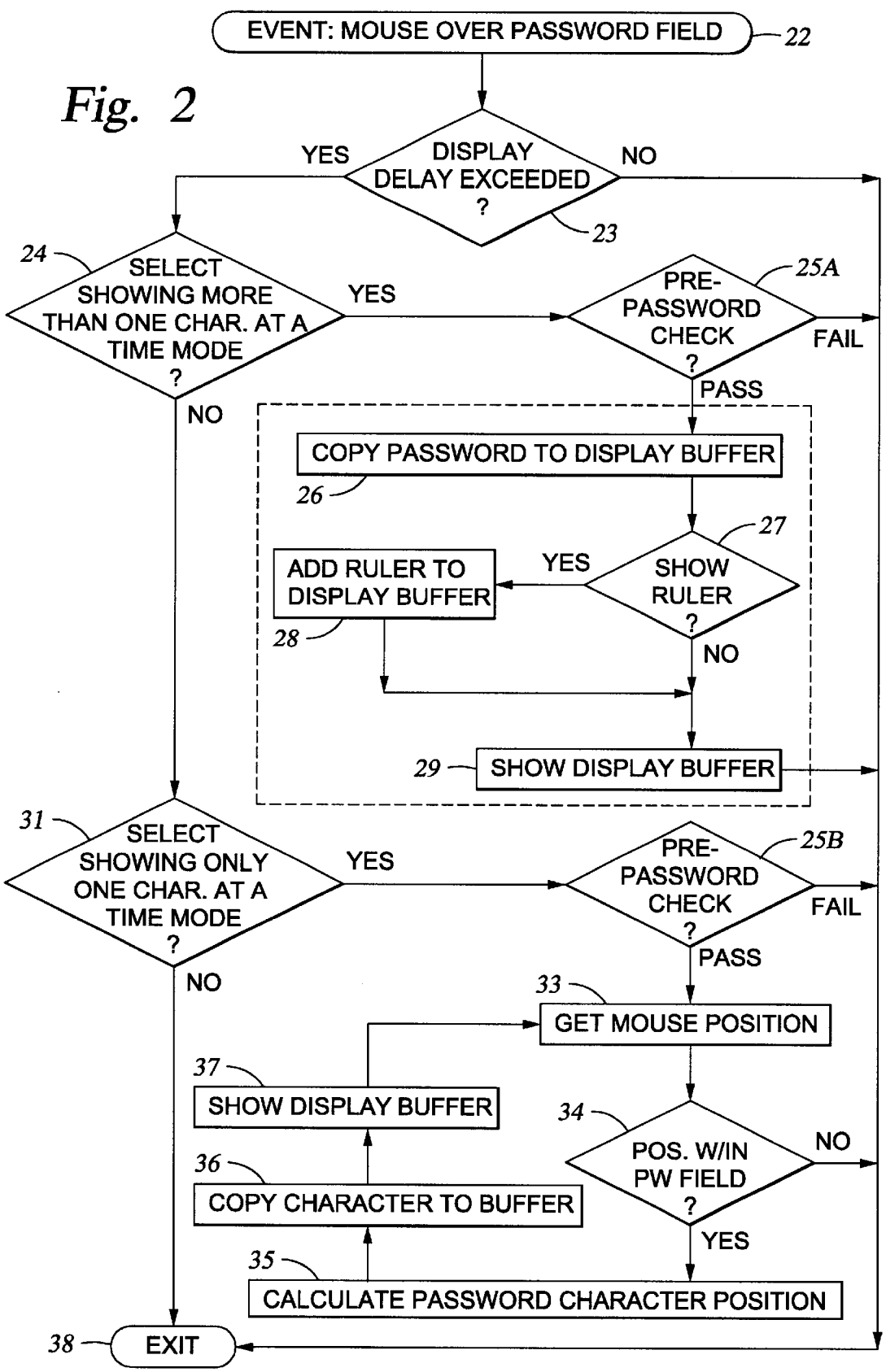
FIG. 2 is a flow chart depicting an exemplary embodiment of a computer program in accordance with aspects of the present invention.

Referring to FIG. 2, there is shown an illustrative flow diagram of a password access program 30. FIG. 2 is described with reference to FIG. 1 as is necessary. At event 22, cursor object 19 is positioned in near proximity or over interface object 20 or field 18. For clarity of explanation, it will be assumed that cursor object 19 is positioned over password field 18 using a mouse 15. However, it will be apparent to those of ordinary skill that other embodiments disclosed herein may be used.

In response to positioning cursor object 19 over password field 18, computer 10 begins timing using a clock (not shown) of processor 11. At step 23, if cursor object 19 has not been positioned over password field 18 for a sufficient time, then program 30 exits at step 38. However, at step 23, if cursor object 19 is positioned over password field 18 for a sufficient time, illustratively approximately one or two seconds, then program 30 proceeds to step 24.

At step 24, it is determined whether a portion of password 17 greater than one character is to be displayed at some instant of time. Accordingly, it should be understood that whether one, two, three, four, or more characters are displayed in an unmasked form at a time may be a function of level of security. For example, a more secure site may only allow a single character to be displayed in an undisguised form at a time in comparison to a site allowing more than a single character to be displayed. Such a portion may be two or more characters, and may be the entire password 17. If more than one character is to be undisguised for display, then program 30 proceeds to a pre-password check 25A, which is described in more detail with reference to FIG. 3. Examples of displaying an entire password 17 or a portion thereof are illustratively shown in FIGS. 4A and 4C, respectively.

Figure 4A:
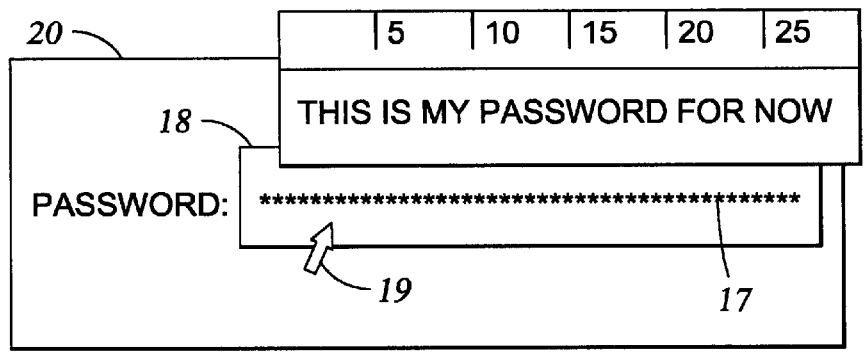
FIGS. 4A, 4B and 4C depict exemplary portions of respective embodiments of a password user interface in accordance with aspects of the present invention.

In FIG. 4A, a floating password field 18F is shown for providing password in an undisguised form, namely undisguised password 17U as compared to disguised password 17D. A ruler 99 may be employed to aid a user in determining character position.

Figure 4B:
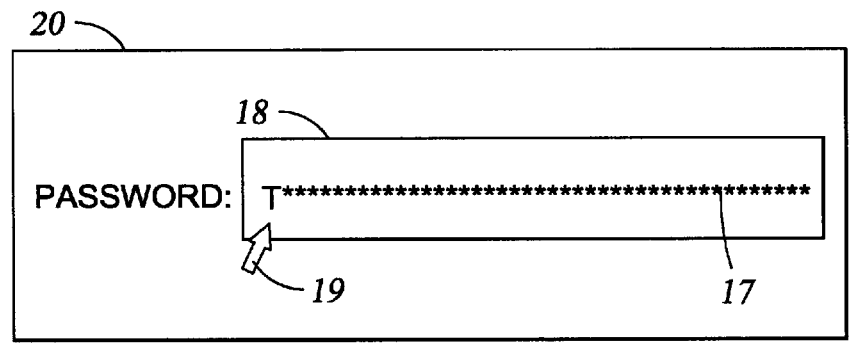
Figure 4C:
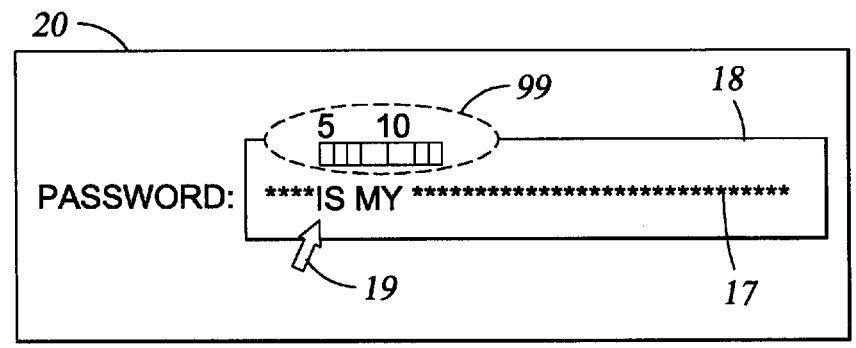

In FIG. 4C, a five-character portion of password 17 is shown. Notably, a starting location of such a portion is determined by relative position of cursor object 19 to a character of password 17.

If a portion of password 17 equal to or greater than two characters is not to be displayed, then program 30 proceeds from step 24 to step 31. Accordingly, it should be understood that a portion of password 17 greater than two characters may be accessed for display in a unmasked form; however, for purposes of clarity of explanation, it will be assumed that all of password 17 is to be displayed with respect to subroutine 97. Moreover, it should be understood that display of all characters of password 17 in an undisguised form may be limited in time, for example to approximately 5 to 60 seconds. It should be further understood if cursor object 19 is move away from being over password field 18, then all characters of password 17 are re-displayed in a disguised form.

At step 31, it is determined whether only a single character of password 17 is to be displayed at a time in an undisguised manner. If one character is to be undisguised for display, then program 30 proceeds to a pre-password check 25B, which is described in more detail with reference to FIG. 3. An example of displaying a character of password 17 in an undisguised form is illustratively shown in FIG. 4B. In FIG. 4B, a first character of password 17 is shown in an undisguised form. A character selected for display in an undisguised form is determined by position of cursor object 19. If no character of password 17 may be displayed in an undisguised form on display 16, then program 30 exits at step 38.

With continuing reference to FIGS. 1 and 2, 25A–B produce either a fail value or pass value. If a fail result occurs at pre-password check 25A or 25B, then program 30 exits at step 38. If pre-password check 25A is passed, then subroutine 97 is entered. At step 26 password 17 is copied to a display buffer 98 for display in an undisguised form. At optional step 27, it is determined whether a ruler object ("ruler") 99 is displayed. Ruler 99 or a portion thereof may be used to indicate position of characters, as illustratively shown in FIG. 4A and FIG. 4C, respectively. If ruler 99 is not presently displayed, ruler 99 is optionally added to display buffer 98 at step 28. At step 29, contents in buffer 98 are displayed on display 16, namely an undisguised password 17 and optionally ruler 99. Step 29 may include timing display of undisguised characters of password 17, and stopping such display after a predetermined time. After displaying such information, program 30 exits at step 38.

If pre-password check 25B is passed, then at step 33, the position of cursor object 19 is obtained. At step 34, it is determined whether cursor object 19 is presently positioned within password field 18. If not, program 30 exits at step 38. If cursor object 19 is presently positioned within password field 19, then at step 35, the position of cursor object 19 relative to password 17 is determined to locate a character to be displayed in an undisguised form. At step 36, the character located in step 35 is copied into display buffer 98. At step 37, contents of display buffer 98 are displayed on display 16. After step 37, program 30 goes to step 33 of subroutine 90 to obtain position of cursor object 19. For example, a user may move cursor object 19 in order to display another character or to terminate displaying password information by moving cursor object 19 out of password field 18.

Figure 3:
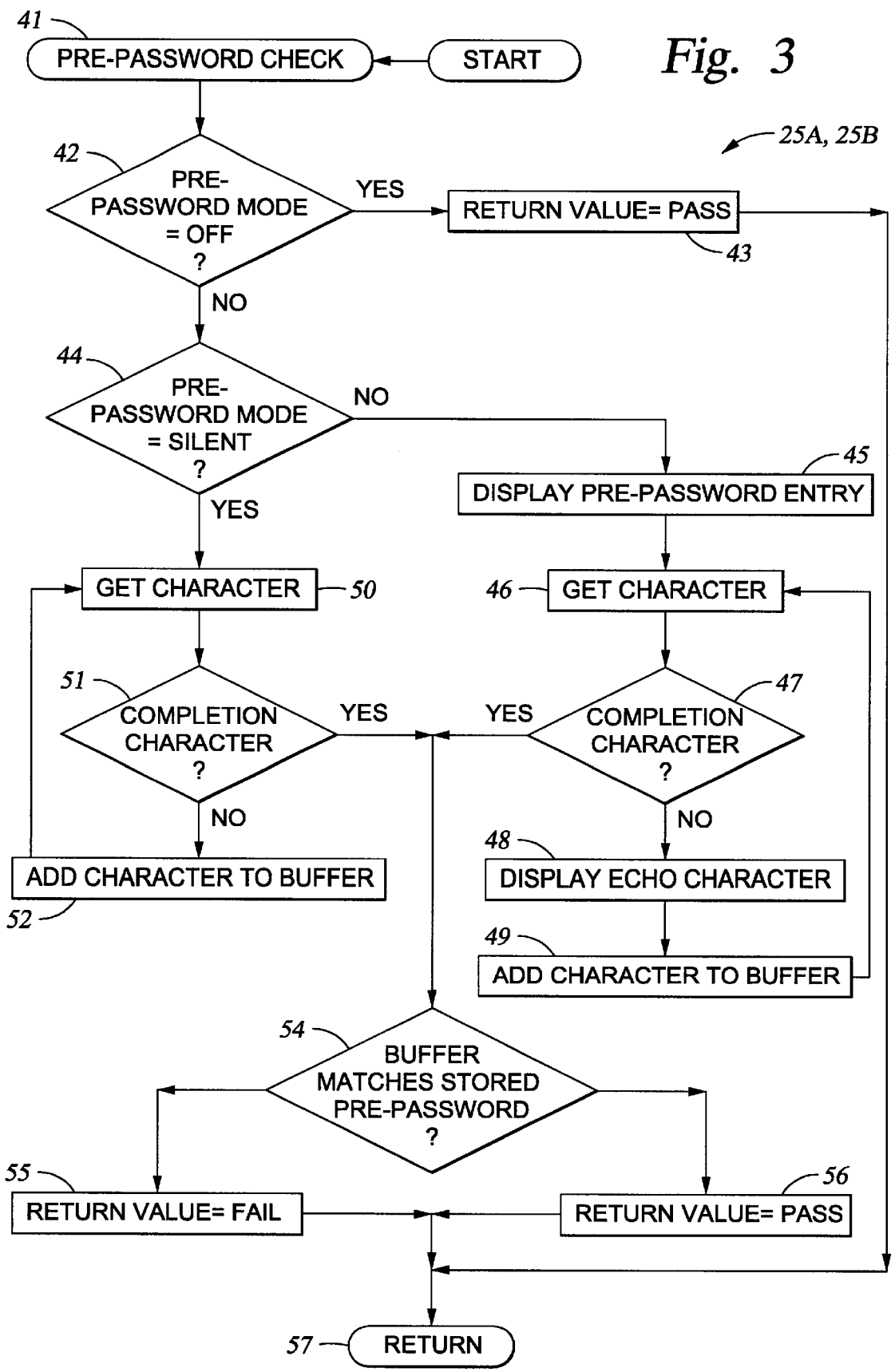
FIG. 3 is flow chart depicting an exemplary embodiment of a routine that may be used in the computer program of FIG. 2 in accordance with an aspect of the present invention.

Illustrative embodiments of pre-password checks 25A and 25B are shown as a flow diagram in FIG. 3. Generally, pre-password checks 25A and 25B are used to determine whether undisguised access to password 17 is permitted. Pre-password 95 is shorter than password 17. Accordingly, pre-password 95 should be easier for a user to accurately input, or if inaccurately inputted, more easily corrected, then entry of password 17. If a user already knows what password 17 is suppose to look like, then there is less of a need with respect to security use of a pre-password. In other words, if a user has already inputted password 17, they presumably are authorized to see what they inputted. Moreover, a pre-password 95 may be utilized as a security precaution by enabling an additional verification of a user with respect to an inputted password 17 left for some period of time, such as a fire drill, trip to the bathroom, or other interruption.

At step 41, pre-password check 25A or 25B is invoked. For purposes of clarity of description, it will be assumed that pre-password check 25A is invoked; however, it will be understood by those in the art of the present invention that this disclosure encompasses invoking pre-password check 25B. At optional step 42, it is determined whether pre-password check 25A is active. This is a feature may be used to eliminate the need to input a pre-password for situations involving lower security thresholds. Accordingly, this feature may be set by a security administrator. If pre-password check 25A is not active, then a pass condition is returned at step 43. At step 57, pre-password routine returns to program 30, namely in this embodiment to step 26 of subroutine 97.

If pre-password check 25A is active or on at step 42, then at step 44, it is determined whether a "silent" pre-password mode is active. By "silent," it is meant that no graphical user interface, such as pre-password field 96, pops-up on display 16 to indicate that a pre-password 95 is to be inputted by a user. Rather, computer 10 automatically interprets immediately subsequent user keyed information as an inputted pre-password 95. If step 44 is answered affirmatively, then, at step 50, a user inputted character is obtained. At step 51, it is determined whether this character is a "completion character." Computer 10 interprets a command key input, such as activation of an ENTER key, as a "completion character" for inputting pre-password 95. If the character obtained at 50 is not a completion character, then this character is added to a character buffer of computer 10 at step 52 and another character is obtained at step 50.

Once a completion character is inputted as determined at step 51, then user pre-password 95 in the character buffer is compared to a stored version of pre-password 95 at step 54. If pre-password 95 inputted matches pre-password 95 stored, then a pass value is returned at step 56. If the imputed pre-password 95 does not match the stored pre-password 95, then a fail value is returned at step 55. After a pass or a fail value is returned, at step 57 pre-password check 25A proceeds to step 26 or step 38, respectively, of program 30. For pre-password check 25B, a pass value is returned to step 33 of program 30, and a fail value is returned to step 38 of program 30.

If at step 44, silent pre-password mode is not active, then pre-password check 25A proceeds to display pre-password field 96 at step 45. At step 46, a user inputted character is obtained. At step 47, 25A determines whether the character obtained at step 46 is a completion character. If such a character is not a completion character, the character is echoed or outputted in a disguised form for display on display 16 at step 48 and added to a character buffer at step 49. After echoing for display, another user inputted character is obtained at step 46. If, however, the character obtained at step 46 is a completion character, then user inputted pre-password 95 is checked against a stored version thereof at step 54, as previously described above.

Although various embodiments, which incorporate the teachings of the present invention, have been shown and described in detail herein, those skilled in the art can readily devise many other varied embodiments that still incorporate these teachings.

OS/2 and OS/400 are trademarks of International Business Machines Corporation. All other trademarks are the property of their respective owners.

What is claimed is:

1. A method for revealing at least a portion of a password on a display device, the password disguised to curtail unauthorized disclosure, the method comprising:
   displaying on the display device a graphical user interface comprising a password field;
   displaying on the display device a cursor object;
   determining if the cursor object has been continuously positioned over a portion of the password field for at least a predetermined time;
   if the cursor object has been continuously positioned over the password field for at least the predetermined time, then
      determining if access to the password is authorized; and
      if access to the password is authorized, displaying at least the portion of the password in an undisguised form.

2. The method of claim 1 wherein the undisguised form of the password is displayed as only one character of the password at a time.

3. The method of claim 1 wherein the undisguised form of the password is displayed as more than one character of the password at an instance but less than all characters of the password during the instance.

4. The method of claim 1 wherein the undisguised form of the password is displayed as all characters of the password for a time limited duration.

5. A method for revealing at least a portion of a password on a display device, comprising:
   displaying on the display device a graphical user interface comprising a password field;
   displaying, in the password field, input in a disguised form;
   displaying, on the display device, a cursor object;
   determining if the cursor object has been continuously positioned over the password field for at least a predetermined time;
   if the cursor object has been continuously positioned over the password field for at least the predetermined time, revealing only a portion of the input in an undisguised form, wherein a remaining portion of the input remains in the disguised form.

6. The method of claim 5 wherein revealing is performed only after determining that access to the input is authorized.

7. A method for selectively displaying a portion of a first password on a display device in communication with a programmed computer, the method comprising:
   invoking a cursor object for display on the display device;
   invoking a graphical user interface for display on the display device, the graphical user interface configured with a password field to receive the first password;

providing access to at least a portion of the first password at least in partial response to the cursor object having a positional association with the password field of the graphical user interface;

waiting for an amount of time of continuous positioning of the cursor object over the password field prior to accepting input associated with a second password;

processing input to the programmed computer without displaying on the display device characters associated with the input;

determining if the input is the second password; and if the input is the second password, providing the access.

* * * * *